United States Patent
Hashizume

(10) Patent No.: US 11,441,513 B2
(45) Date of Patent: Sep. 13, 2022

(54) PISTON OF INTERNAL COMBUSTION ENGINE AND A MANUFACTURING METHOD THEREOF

(71) Applicant: TOYOTA JIDOSHA KABUSHIKI KAISHA, Toyota (JP)

(72) Inventor: Takeshi Hashizume, Mishima (JP)

(73) Assignee: Toyota Jidosha Kasbushiki Kaisha, Toyota (JP)

(*) Notice: Subject to any disclaimer, the term of this patent is extended or adjusted under 35 U.S.C. 154(b) by 0 days.

(21) Appl. No.: 17/111,756

(22) Filed: Dec. 4, 2020

(65) Prior Publication Data
US 2021/0222645 A1  Jul. 22, 2021

(30) Foreign Application Priority Data
Jan. 16, 2020  (JP) .............................. JP2020-005251

(51) Int. Cl.
*F02F 3/00*  (2006.01)
*F02F 3/26*  (2006.01)

(52) U.S. Cl.
CPC .............. *F02F 3/0084* (2013.01); *F02F 3/26* (2013.01); *F02F 2003/0007* (2013.01); *F02F 2200/06* (2013.01)

(58) Field of Classification Search
CPC ... F02F 3/12; F02F 3/10; F02F 7/0087; F05C 2201/021; C25D 11/022
USPC ...................................................... 123/193.6
See application file for complete search history.

(56) References Cited

U.S. PATENT DOCUMENTS

| 4,735,128 A * | 4/1988 | Mahrus ................ F02F 7/0087 29/888.047 |
| 10,774,729 B2 * | 9/2020 | Goto ........................ F02B 3/06 |
| 2016/0025035 A1 * | 1/2016 | Kadoshima ................ F16J 1/01 252/62 |

(Continued)

FOREIGN PATENT DOCUMENTS

| CN | 110056423 A | 7/2019 |
| JP | 2019-074009 A | 5/2019 |

OTHER PUBLICATIONS

Wakisaka, Yoshifumi et al., "Heat Insulation by 'Temperature Swing' in Combustion Chamber Walls (Second Report)", Transactions of Society of Automotive Engineers of Japan, 20164027, vol. 47, No. 1, Jan. 2016, pp. 39-45.

(Continued)

*Primary Examiner* — Long T Tran
*Assistant Examiner* — James J Kim
(74) *Attorney, Agent, or Firm* — Finnegan, Henderson, Farabow, Garrett & Dunner, LLP

(57) ABSTRACT

A piston has a top surface composed of porous alumina. Top surface includes a first region and a second region. The first region includes a part or all of a region connecting to an outer periphery of the top surface. The second region is adjacent to the first region. The second region includes some or all of the region inside the top surface. The porous alumina formed on the second region is thinner than that formed on the first region. In a manufacturing method of a piston, first, a casting piston made of aluminum alloy is prepared. Then, a casting surface in a first region is removed, thereby a material surface is exposed. Then, anodization of the casting piston is performed, whereby a porous alumina is formed on the first and second regions.

6 Claims, 12 Drawing Sheets

(56) References Cited

U.S. PATENT DOCUMENTS

2017/0122250 A1* 5/2017 Yamashita .......... F02B 23/0639
2019/0218958 A1* 7/2019 Goto ......................... F02F 3/12
2019/0257266 A1* 8/2019 Goto ......................... F02F 3/12
2020/0123999 A1* 4/2020 Suzuki ...................... F02F 3/14

OTHER PUBLICATIONS

Kawaguchi, Akio et al., "Heat Insulation by 'Temperature Swing' in Combustion Chamber Walls (Third Report)", Transactions of Society of Automotive Engineers of Japan, 20164028, vol. 47, No. 1, Jan. 2016, pp. 47-53.

* cited by examiner

PISTON OF INTERNAL COMBUSTION ENGINE AND A MANUFACTURING METHOD THEREOF

CROSS-REFERENCE TO RELATED APPLICATION

The present application claims priority under 35 U.S.C. § 119 to Japanese Patent Application No. 2020-005251, filed Jan. 16, 2020. The contents of this application are incorporated herein by reference in their entirety.

TECHNICAL FIELD

Present disclosure relates to a piston of an internal combustion engine (hereinafter also referred to simply as an "engine") having a top surface on which a heat insulation coating is formed, and a method for producing the same.

BACKGROUND

JP2019-074009A discloses a piston of an engine having a top surface on which a heat insulation coating is formed. The heat insulation coating has a layer composed of porous alumina (hereinafter also referred to as an "alumite layer"). The porous alumina is formed by anodization of a material of the piston. The alumite layer exhibits lower thermophysical property in volume specific heat and thermal conductivity than the material due to its structure.

According to the piston in which the alumite layer is formed, temperature of the top surface can be made to follow the temperature of working gas in a combustion chamber of the engine. That is, in an expansion stroke of the engine, the temperature of the top surface can be made to follow that of rising combusted gases. In an intake stroke of the engine, the temperature of the top surface can be made to follow that of intake gas having a relatively lower temperature. Such the following characteristic is also called a "swing characteristic". According to the swing characteristic, it is possible to achieve both a reduction of cooling loss and a suppression of an occurrence of knocking.

SUMMARY

On a surface of the alumite layer, an infinite number of pores extending in a thickness direction are opened. Therefore, it is expected that fuel in the combustion chamber will enter an interior of the alumite layer from openings of these pores. That is, the fuel in the combustion chamber are expected to infiltrate the alumite layer.

Such infiltration of the fuel is less likely to occur if the temperature of the alumite layer is high. This is because it is expected that atomization state of the fuel will be maintained even if the fuel contacts alumite layer. However, according to the swinging characteristics described above, the temperature of the alumite layer may be lowered during the intake stroke. Therefore, the fuel contacting with the alumite layer may penetrate into the alumite layer and may not evaporate on a compression stroke of the engine.

In addition, according to the swinging characteristics described above, the temperature of the alumite layer rises in the expansion stroke. Therefore, the fuel that penetrates into the alumite layer may evaporate in a second half of the expansion stroke. As a result, the fuel may not be burned during the expansion stroke, and discharged to an outside of the combustion chamber in a subsequent exhaust stroke of the engine. Therefore, in the engine in which the alumite layer is formed, there is a problem that a part of the fuel does not contribute to burning and energy efficiencies are lowered.

In a part of a region on the top surface described above, a sealing layer for sealing the openings is formed on the alumite layer. If the openings are sealed, the infiltration of the fuel can be suppressed. However, if the sealing layer is formed, layer thickness of the heat insulation coating increases. This may increase thermal capacity of the entire heat insulation coating. In addition, if the sealing layer is formed, its volume specific heat and thermal conductivity may affect the thermophysical property of the heat insulation coating.

Therefore, it may be difficult to maintain the swing characteristics.

One object of present disclosure is to provide a technique capable of suppressing the fuel that does not contribute to burning while utilizing the swinging characteristics of the alumite layer in the engine including the piston having the top surface in which the alumite layer is formed.

A first aspect of the present disclosure is a piston of an internal combustion engine and has the following features.

The piston includes a top surface composed of porous alumina.

The top surface includes a first region and a second region.

The first region includes a part or all of a region connecting to an outer periphery of the top surface.

The second region includes a part or all of a region inside the top surface.

The porous alumina formed in the second region is thinner than that formed in the first region.

A second aspect of the present disclosure further has the following feature in the first aspect.

In the top surface, a valve recess part is formed.

A surface constituting the valve recess part belongs to the second region.

A third aspect of the present disclosure further has the following feature in the first aspect.

In the top surface, a valve recess part is formed.

A surface constituting the valve recess part belongs to the first region.

A fourth aspect of the present disclosure further has the following feature in the first aspect.

The first region includes all of the regions connecting to the outer periphery.

The second region is located inside the first region.

A fifth aspect of the present disclosure further has the following feature in the first aspect.

The porous alumina has a pore extending in a thickness direction.

An opening of the pore opens to the top surface.

A sixth aspect of the present disclosure is a method for manufacturing a piston of an internal combustion engine, and has the following features.

The piston includes a top surface composed of porous alumina.

Top surface includes a first region and a second region.

The first region includes a part or all of a region connecting to an outer periphery of the top surface.

The second region includes a part or all of a region inside the top surface.

The manufacturing method includes the steps of:

preparing a casting piston made of aluminum alloy of which the top surface is covered with a casting surface;

removing the casting surface in the first region to expose a material surface of the casting piston; and forming a porous alumina in the first and second regions by anodization of the casting piston including the exposed material surface.

According to the first to fifth aspects, the top surface of the piston is composed of the porous alumina. That is, there is no layer (i.e., a sealing layer) provided to seal the opening of the pore. Therefore, various problems that increase with the formation of the sealing layer do not occur. Therefore, the thermophysical property of the alumite layer can be utilized to reliably obtain effects due to the swing characteristic.

According to the first to fifth aspects, further, the alumite layer in the second region is thinner than that in the first region. Therefore, it is possible to suppress an amount of the fuel that infiltrates the alumite layer in the second region. In addition, if the alumite layer in the second region is thin, it makes possible for the fuel to easily escape from the opening when the infiltrated fuel in the alumite layer evaporates. Therefore, it makes possible to make the escaped fuel to be burned during the expansion stroke. Therefore, it is also possible to suppress the energy efficiencies are lowered due to the generation of the fuel that does not contribute to burning.

According to sixth aspect, the casting surface of the casting piston is removed only in the first region. Therefore, it is possible to shorten processing time as compared with a case where the casting surface is removed in the first and second regions. Therefore, it is possible to reduce manufacturing cost of the piston.

According to the sixth aspect, further, the anodization is carried out while the the material surface is exposed in the first region and the casting surface is left in the second region. Here, oxidation speed of the material constituting the casting surface is slower than that of the material constituting the material surface Therefore, by performing the anodization in a state where the material surface and the casting surface are mixed, it is possible to obtain the piston in which the alumite layer in the second region is thinner than that in the first region.

DESCRIPTION OF EMBODIMENT

Figure 1:
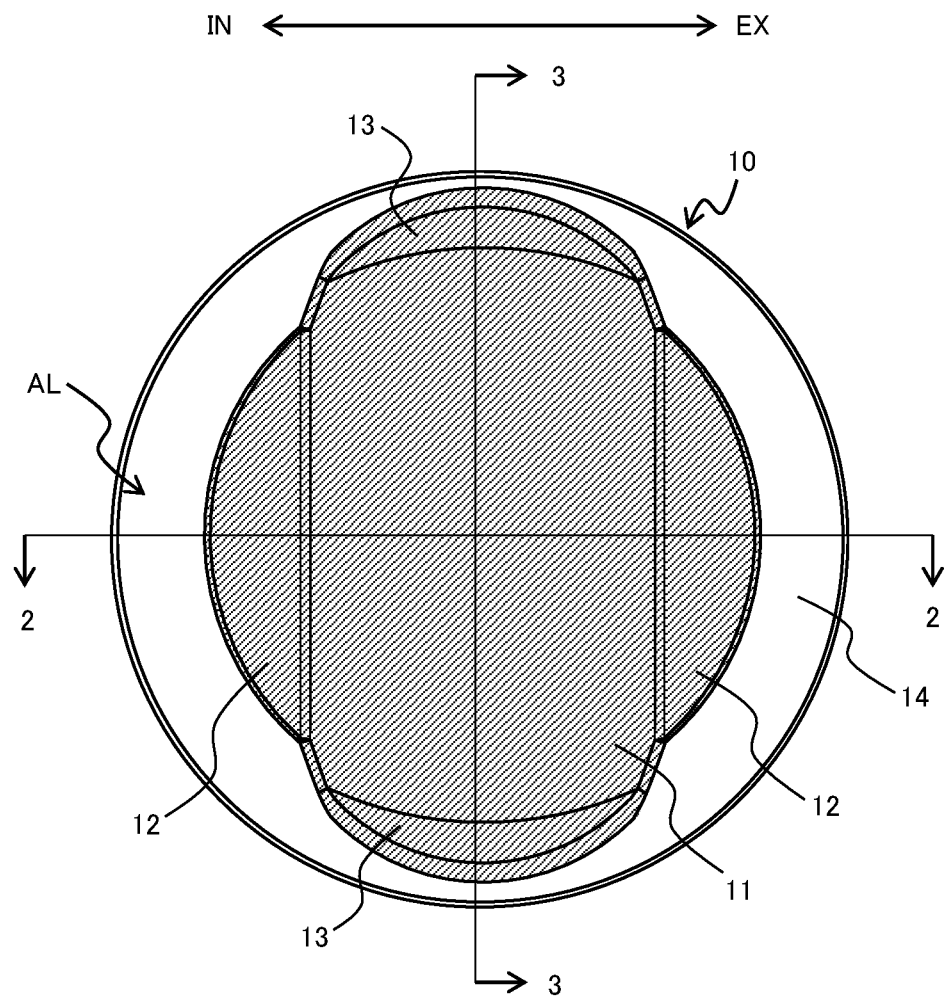
FIG. 1 is a plan view showing a first configuration example of a piston according to an embodiment.

Hereinafter, an embodiment of the present disclosure will be described with reference to drawings. In the drawings, the same or corresponding portions are denoted by the same sign, and descriptions thereof are simplified or omitted.

1. Configuration Example of Piston

First, a configuration of a piston according to an embodiment of the present disclosure will be described with reference to FIGS. 1 to 9. The piston according to the present embodiment is preferably applied to an engine mounted on a vehicle. Such engine includes a spark-ignition type engine and compression self-ignition type engine.

1-1. First Configuration Example

Figure 2:
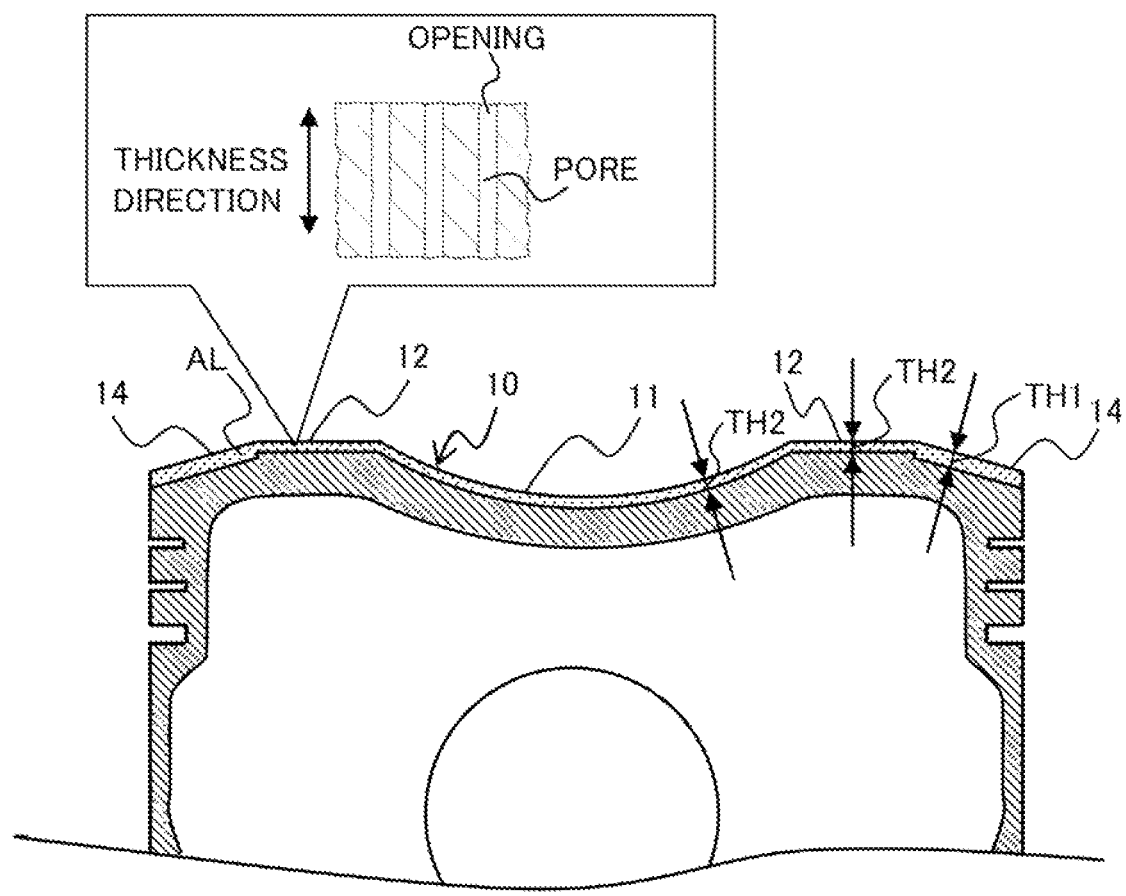
FIG. 2 is a cross-sectional view of the piston taken along a line 2-2 shown in FIG. 1.
Figure 3:
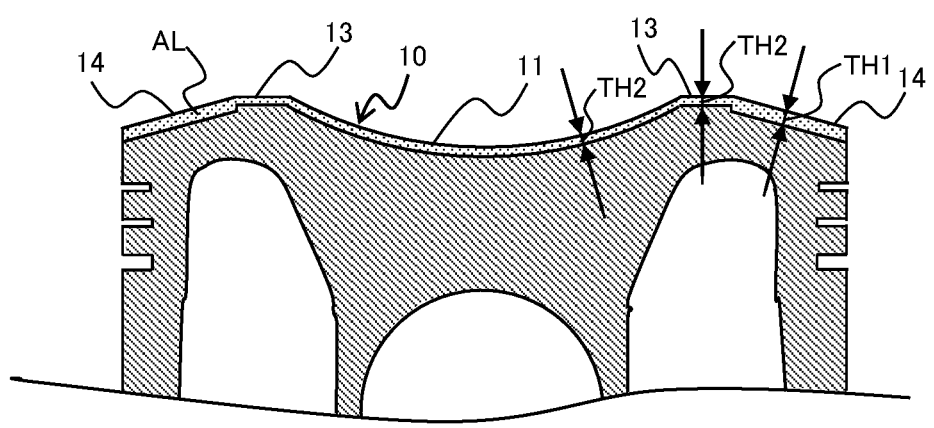
FIG. 3 is a cross-sectional view of the piston taken along line 3-3 shown in FIG. 1.

FIG. 1 is a plan view showing a first configuration example of the piston according to the present embodiment. A direction "IN" shown above in FIG. 1 represents an intake direction of the engine, and that "EX" represents an exhaust direction of the engine. FIG. 2 is a cross-sectional view of the piston taken along a line 2-2 shown in FIG. 1. FIG. 3 is a cross-sectional view of the piston taken along a line 3-3 shown in FIG. 1.

The piston shown in FIGS. 1 to 3 is applied to the spark-ignition type engine. As shown in FIGS. 1 to 3, a top surface 10 of the piston includes a dish-like hollow part 11, flat parts 12 and 13, and a slope part 14. The hollow part 11 is formed on a central portion of the top surface 10. The hollow part 11 is formed in order to diffuse mixed gas consisting of intake air and fuel injected from an injector (not shown) into a combustion chamber. The flat parts 12 and 13 are formed on an exterior of the hollow part 11. The slope part 14 is formed on an exterior of the flat parts 12 and 13. The slope part 14 slopes inwardly of the piston as it moves away from the center of the top surface 10. The slope part 14 forms a squish area with a bottom surface of a cylinder head (not shown) when the piston rises.

The shapes of the pistons shown in FIGS. 1 to 3 are known. The known piston includes a piston that do not have flat parts 12 and 13 but have the slope part 14 located outside the hollow part 11.

As shown in FIGS. 1 to 3, an alumite layer AL is formed on the top surface 10. The alumite layer AL has innumerable pores that regularly extend in a thickness direction. Such structure of the alumite layer AL is disclosed, for example, in JP2013-060620A. Thermophysical property of the alumite layer AL is as described above.

The feature of the first configuration example is a difference between a layer thicknessTH1 of the alumite layer AL in a first region and that of a layer thicknessTH2 in a second region. In FIG. 1, a hatched region corresponds to the second region. That is, the second region corresponds to a region of a surface constituting the hollow part 11, the flat parts 12 and 13. A region other than the second region correspond to the first region. That is, the first region corresponds to a region of a surface constituting the slope part 14.

As shown in FIGS. 2 and 3, the layer thickness TH2 is thinner than the layer thicknessTH1. As typical methods for measuring the layer thicknesses TH1 and TH2, a direct method is exemplified. In the direct method, first, the piston is cut along the thickness direction of the alumite layer AL.

Then, at any point in a region corresponding to the first and second regions, the thickness of the alumite layer AL is measured. A plurality of measurement points may be used. In this instance, the layer thicknesses TH1 and TH2 are represented by average, median or mode values of the plurality of measured value.

A magnitude relation between the layer thicknesses TH1 and TH2 is the same in a second to seventh configuration examples described below. Therefore, in the description with respect to the second to seventh configuration examples, the description with respect to a positional relation between the first and second regions will be mainly given, and that with respect to the magnitude relation using a cross-sectional view will be omitted.

1-2. Second Configuration Example

Figure 4:
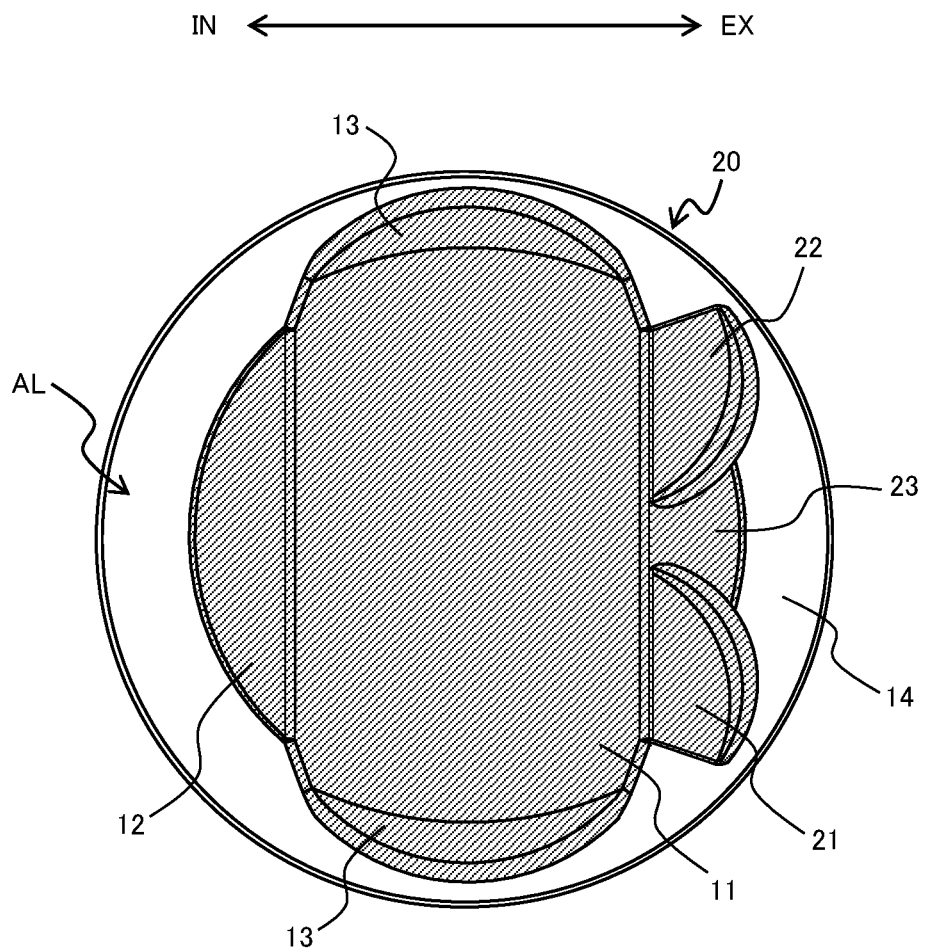
FIG. 4 is a plan view showing a second configuration example of the piston according to the embodiment.

FIG. 4 is a plan view showing the second configuration example of the piston according to the present embodiment. The piston shown in FIG. 4 is applied to the spark-ignition type engine. As shown in FIG. 4, a top surface 20 of the piston is formed with valve recess parts 21 and 22 and flat part 23. The valve recess parts 21 and 22 are formed to prevent two exhaust valves (not shown) from interfering with the top surface 20. The valve recess parts 21 and 22 are inclined inward of the piston toward the center of the top surface 20. The flat part 23 is formed between the valve recess parts 21 and 22. The flat part 23 corresponds to a part of the flat part 12 on the exhaust side of FIG. 1.

In FIG. 4, a hatched region corresponds to the second region. That is, the second region corresponds to a region of a surface constituting the hollow part 11, the flat parts 12, 13, and 23, and the valve recess parts 21 and 22. A region other than the second region correspond to the first region. That is, the first region corresponds to a region of a surface constituting the slope part 14.

1-3. Third Configuration Example

Figure 5:
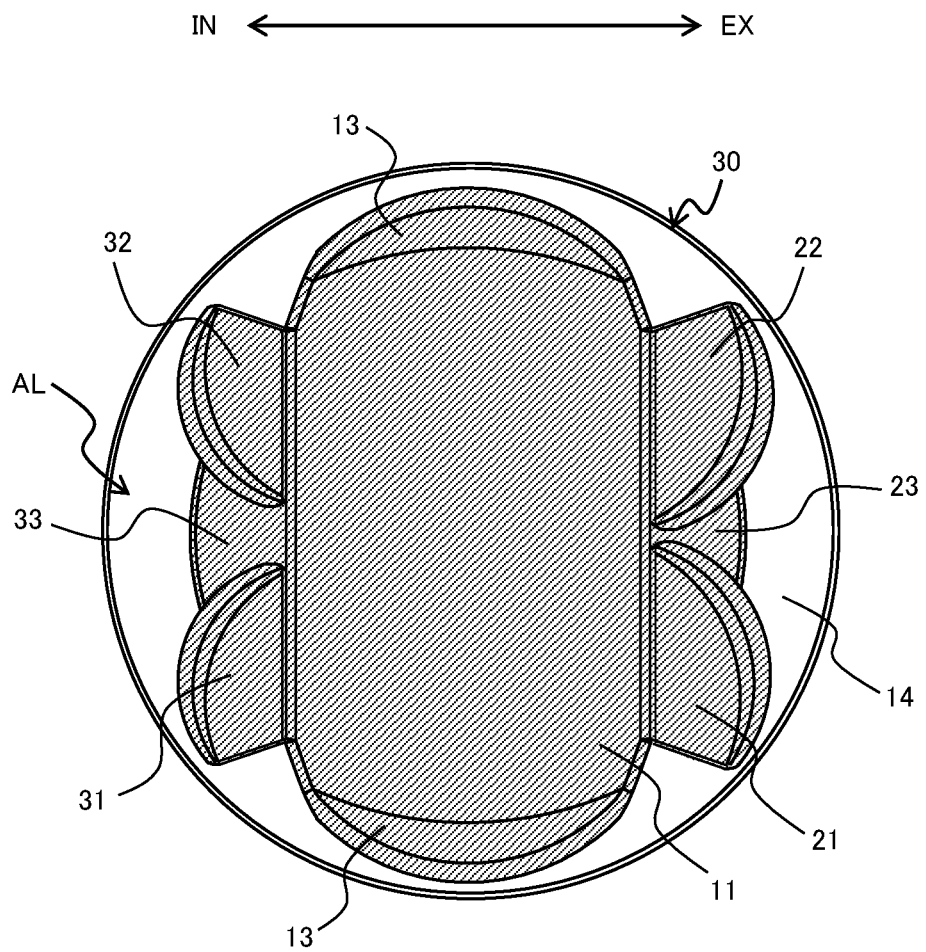
FIG. 5 is a plan view showing a third configuration example of the piston according to the embodiment.

FIG. 5 is a plan view showing a third configuration example of the piston according to the present embodiment. The piston shown in FIG. 5 is applied to the spark-ignition type engine. As shown in FIG. 5, a top surface 30 of the piston is formed with valve recess parts 31 and 32 and a flat part 33. The valve recess parts 31 and 32 are formed to prevent two intake valves (not shown) from interfering with the top surface 30. The valve recess parts 31 and 32 are inclined inward of the piston toward the center of the top surface 30. The flat part 33 is formed between the valve recess parts 31 and 32. The flat part 33 corresponds to a part of the flat part 12 on the exhaust side of FIG. 1.

In FIG. 5, a hatched region corresponds to the second region. That is, the second region corresponds to a region of a surface constituting the hollow part 11, the flat parts 13, 23 and 33, and the valve recess parts 21, 22, 31 and 32. A region other than the second region correspond to the first region. That is, the first region corresponds to a region of a surface constituting the slope part 14.

1-4. Fourth Configuration Example

Figure 6:
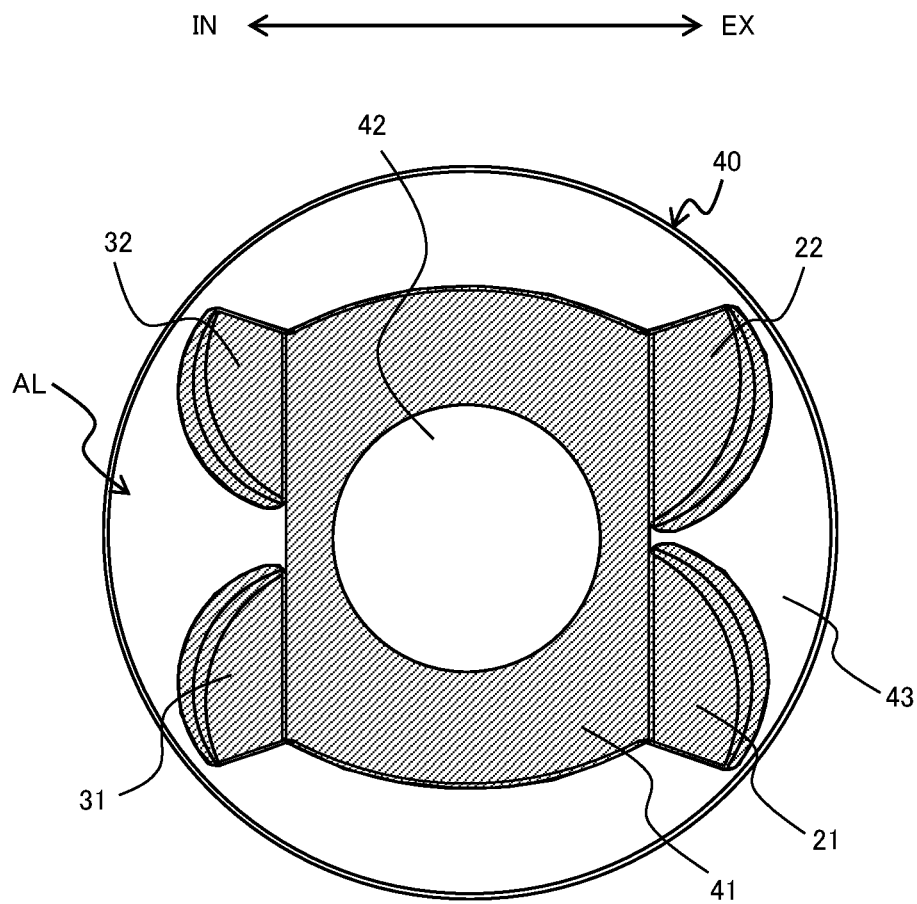
FIG. 6 is a plan view showing a fourth configuration example of the piston according to the embodiment.

FIG. 6 is a plan view showing a fourth configuration example of the piston according to the present embodiment. The piston shown in FIG. 6 is applied to the spark-ignition type engine. As shown in FIG. 6, a dish-like hollow part 41 is formed on a top surface 40 of this piston. The basic shape of the hollow part 41 is the same as the hollow part 11 shown in FIG. 1. However, a hollow part 42 is further formed on a central portion of the hollow part 41. The hollow part 42 is formed in order to improve a burning state. The shape of the hollow part 42 is exemplified by a hemispherical shape. A slope part 43 is formed on an outer side of the hollow part 41. The slope part 43 forms a squish area with the bottom surface of the cylinder head.

In FIG. 6, a hatched region corresponds to the second region. That is, the second region corresponds to a region of a surface constituting the hollow part 41 and the valve recess parts 21, 22, 31 and 32. Regions other than second region correspond to first region. That is, the first region corresponds to a region of a surface constituting the hollow part 42 and the slope part 43.

In the first to third configuration examples, the second region occupies all regions inside the first region. In contrast, in the fourth configuration example, the second region is located between the two first regions. In other words, the second region occupies only a part of the inside of the first region. The reason for making such a positional relationship is that an attention is paid on a region where there are many contact chances with mixed gas before burning. In a region where there are many contact chances, the mixed gas is more likely to enter the inside of the alumite layer AL from the openings of the pores than in the region where there are few contact chances. For this reason, in the region where there are many contact changes, the fuel in the mixed gas tends to penetrate the alumite layer AL.

1-5. Fifth Configuration Example

Focusing on the contact chances, it is expected that contact chances in the region of the surface constituting the valve recess parts 21, 22, 31 and 32 are smaller than those in that constituting the hollow part 41. Therefore, the region of the surface constituting the valve recess parts may be set to the first region. That is, the alumite layer AL in the region of the surface constituting valve recess parts may have the layer thickness TH1.

Figure 7:
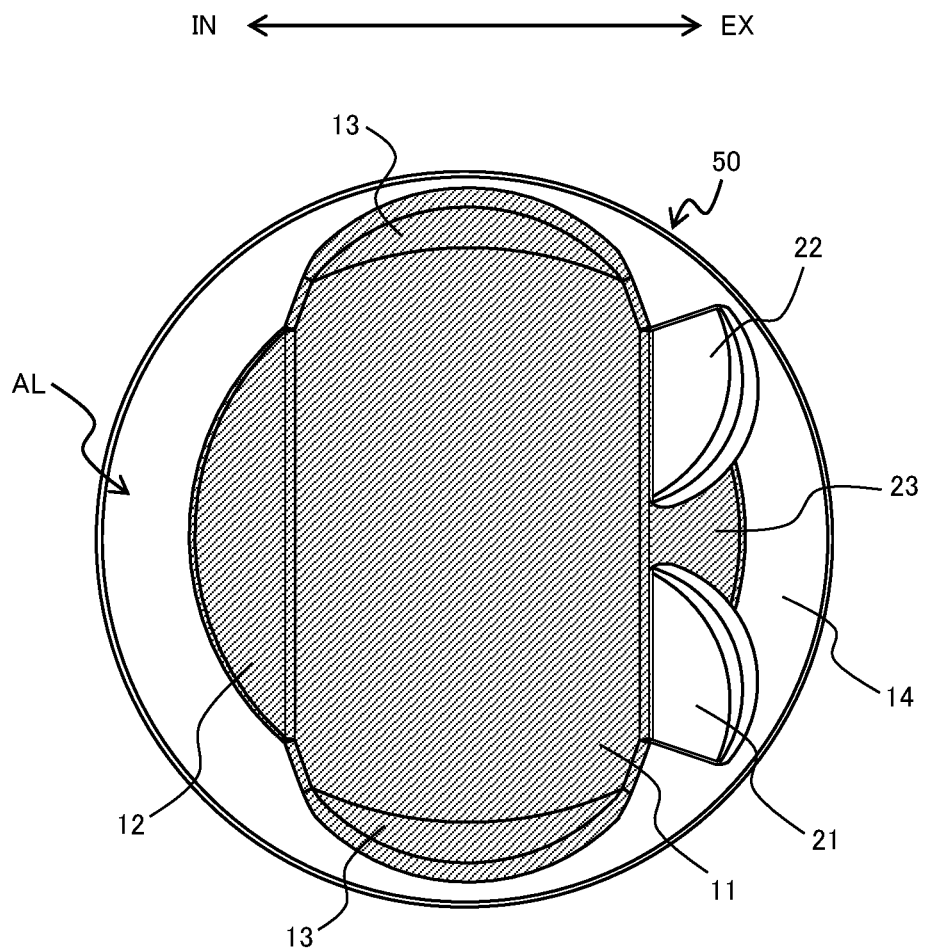
FIG. 7 is a plan view showing a fifth configuration example of the piston according to the embodiment.

FIG. 7 is a plan view showing a fifth configuration example of the piston according to the present embodiment. The shape of the fifth configuration example shown in FIG. 7 is the same as that of the second configuration example. However, in the fifth configuration example, the region of the surface constituting the valve recess parts 21 and 22 differ from the second configuration example in that these parts correspond to the first region rather than the second region.

The variations in the fifth configuration example may be applied to the third and fourth configuration examples shown in FIGS. 5 and 6. That is, the region of the surface constituting the valve recess parts 21, 22, 31, and 32 may correspond to the first region.

Furthermore, some regions of the surfaces constituting the valve recess parts 21, 22, 31 and 32 may be set to the first region. This is because, depending on an injection mode from an injector, it is assumed that the region having many contact chances is biased to a region on the intake side or the exhaust side. For example, an engine in which a region having many contact chances is biased toward the region on the exhaust side will be considered. In this instance, it is expected that contact chances in the intake side will be reduced. Therefore, in this instance, the region of the surface comprising the valve recess parts in the intake side (e.g., the region of the surface constituting the valve recess parts 31 and 32 in the third and fourth configuration examples) may be set to the first region.

1-6. Sixth Configuration Example

Figure 8:
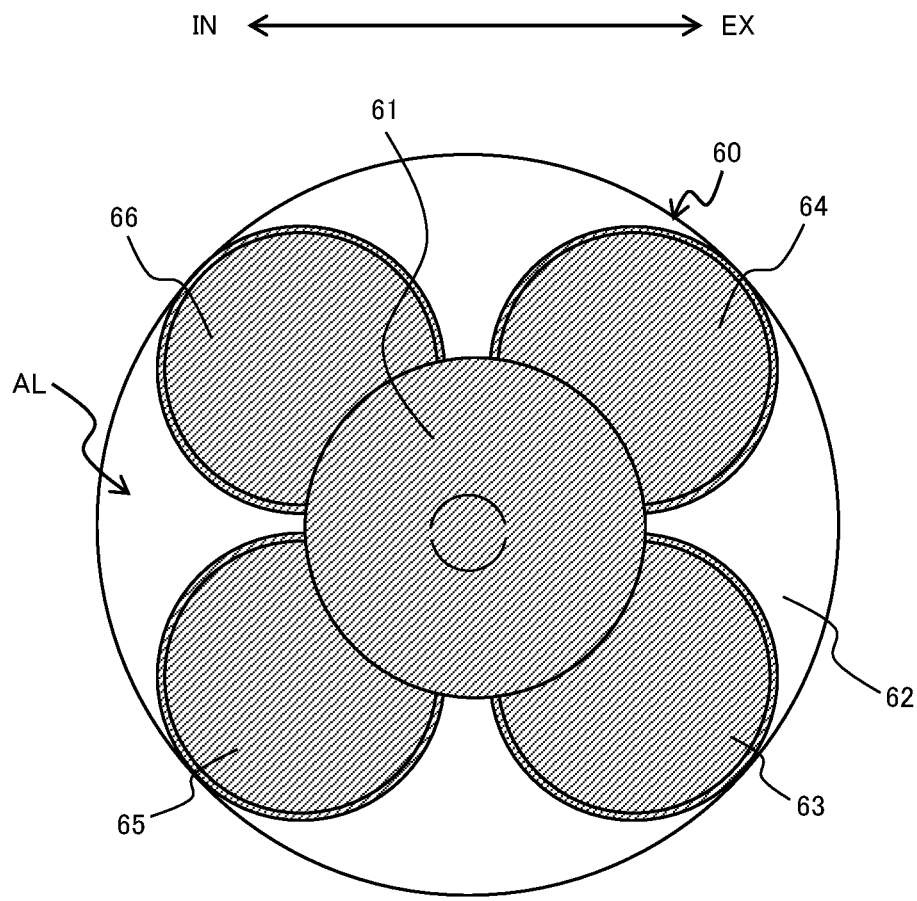
FIG. 8 is a plan view showing a sixth configuration example of the piston according to the embodiment.

FIG. 8 is a plan view showing a sixth configuration example of the piston according to the present embodiment. The piston shown in FIG. 8 is applied to the compression self-ignition engine. As shown in FIG. 8, a top surface 60 of this piston is formed with a hollow part 61, a flat part 62, and valve recess parts 63 to 66. The hollow part 61 constitutes a main combustion chamber of the engine. The valve recess parts 63 to 66 are arranged parallel to the flat part 62. The valve recess parts 63 and 64 are formed to prevent interferences with exhaust valves (not shown). The valve recess parts 65 and 66 are formed to prevent interferences with intake valves (not shown).

In FIG. 8, a hatched region corresponds to the second region. That is, the second region corresponds to a region of a surface constituting the hollow part 61 and the valve recess parts 63 to 66. Regions other than second region correspond to first region. That is, the first region corresponds to a region of a surface constituting the flat part 62.

Here, the surface constituting the flat parts 62 is divided into four by two adjacent valve recess parts. That is, in the sixth configuration example, the first region includes a part of a region connected to an outer periphery of the top surface 60. The surface constituting the valve recess parts 63 to 66 includes a portion of the outer periphery of the top surface 60. That is, in the sixth configuration example, the second region includes the part of the region connected to the outer periphery of the top surface 60.

1-7. Seventh Configuration Example

Figure 9:
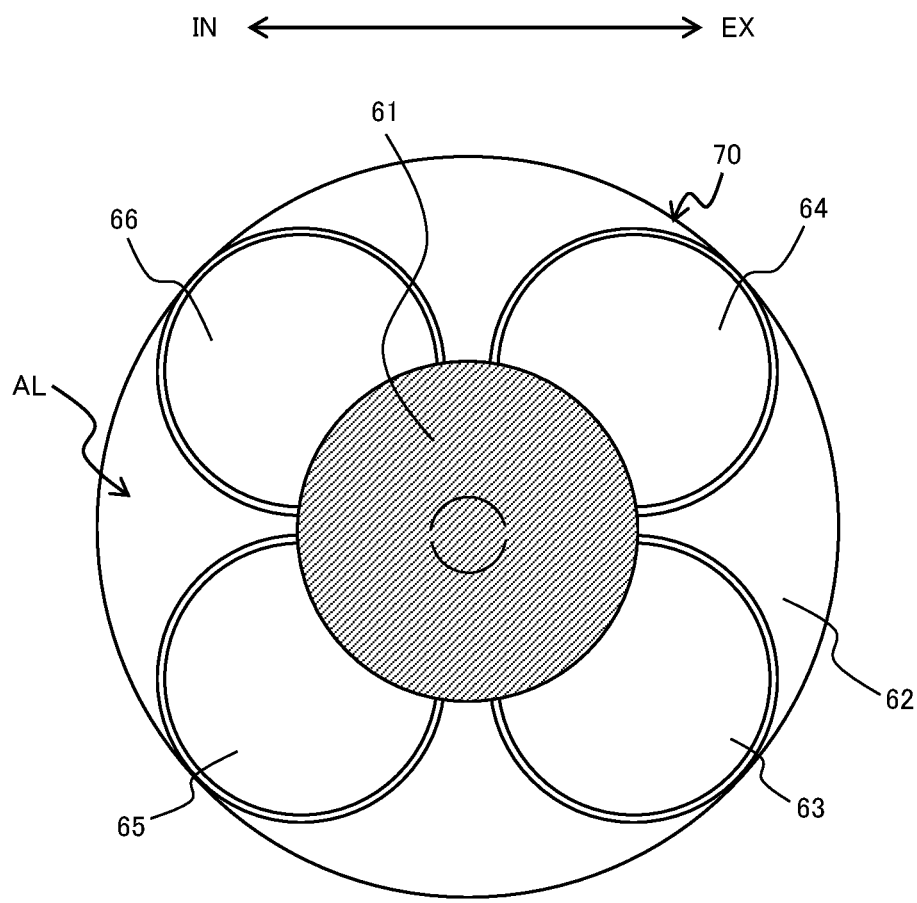
FIG. 9 is a plan view showing a seventh configuration example of the piston according to the embodiment.

FIG. 9 is a plan view showing a seventh configuration example of the piston according to the present embodiment. The shape of the seventh configuration example shown in FIG. 9 is the same as that of the sixth configuration example. However, in the seventh configuration example, a region of a surface constituting the valve recess parts 63 to 66 differs from the sixth second region in that it corresponds to the first region rather than the second region. That is, the relation of the sixth and seventh configuration examples is the same as that of the second and fifth configuration examples described above.

1-8. Effect

In the various configuration examples described above, the top surface is composed of only the alumite layer AL. That is, the various configuration examples do not have any layers to seal openings (i.e., a sealing layer). Therefore, various problems (i.e., problems in total thickness and total volume of the heat insulation coating) do not occur with the formation of the sealing layer. Therefore, according to the piston of the present embodiment, it is possible to reliably obtain the effects due to the swing characteristic by utilizing the thermophysical property of the alumite layer AL.

Also, in the various configuration examples, the layer thickness TH2 is thinner than the layer thickness TH1. Since the layer thickness TH is thin, it is possible to decrease an amount of the mixed gas that enters into the alumite layer AL from the openings of the pores thereby to suppress the amount of the fuel that infiltrates the alumite layer AL. In addition, since the layer thickness TH is thin, the fuel can easily escape from the openings when the fuel infiltrated into the alumite layer AL evaporates. Therefore, according to the piston of the present embodiment, it is possible to suppress the generation of fuel that do not contribute to the burning and suppress reduction of energy efficiencies.

In particular, in the second to fourth and sixth configuration examples, the region of the surface constituting the valve recess parts is set to the second region. Therefore, it is possible to obtain the effect mentioned above even in an engine to which a piston in which a valve recess portion is formed on a top surface is applied.

On the other hand, in the fifth and seventh configuration examples, the region of the surface constituting the valve recess parts is set to the first region. When the region is set to the first region, the layer thickness TH is increased as compared to when the region is set to the second region. Then, the thermal capacity in the region of the surface constituting the valve recess parts will increase. When the thermal capacity increases, temperature in the region of the surface constituting the valve recess parts increase over engine cycles.

Here, each of the valve recess parts has a shape in which suspended matters (e.g., soot) and an engine oil in a combustion chamber tend to accumulate. Therefore, it can be said that deposits are more likely to be accumulated in the valve recess portions than in other regions formed on the top surface. In this respect, if the region of the surface constituting the valve recess parts is set to the first region, the suspended matters or the engine oil adhering thereto can be burned during the expansion stroke. Therefore, it is possible to reduce the amount of the deposits on the valve recess parts.

2. Method for Manufacturing Piston

Next, a method for manufacturing a piston according to an embodiment of the present disclosure will be described with reference to FIGS. 10 to 12.

2-1. Flow of Manufacturing Method

Figure 10:
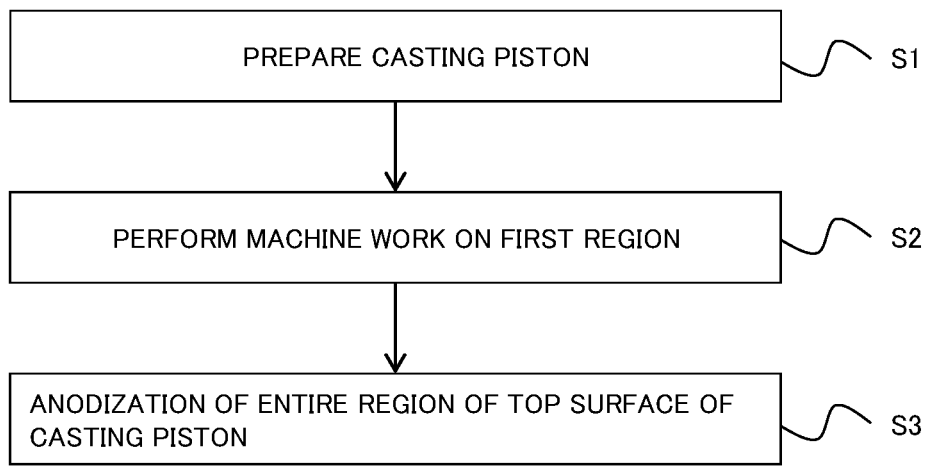
FIG. 10 is a flowchart showing a flow of a manufacturing method of the piston according to the embodiment.

FIG. 10 is a flowchart showing a flow of the manufacturing method of the piston according to the present embodiment. As shown in FIG. 10, in the method according to the present embodiment, first, a casting piston made of aluminum alloy is prepared (Step S1). The casting piston is produced, for example, according to a die casting method. In the die casting method, liquid-like aluminum alloy is poured into a mold and heat treatment is performed thereafter. After solidification of the aluminum alloy, the casting piston is removed from the mold.

Subsequent to the step S1, machine work of the first region is performed (step S2).

Figure 11:
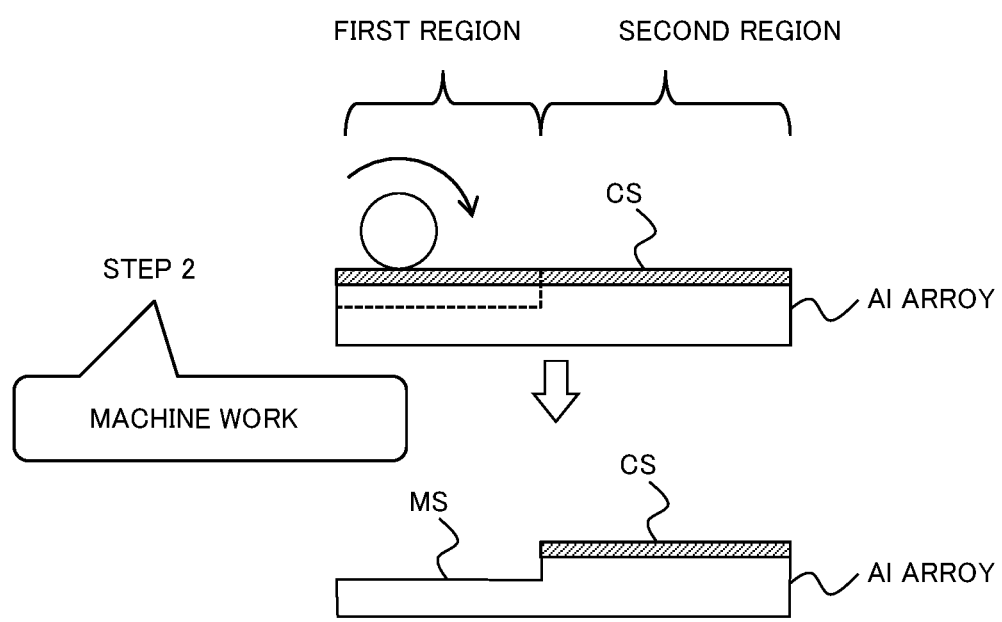
FIG. 11 is a diagram showing an outline of step S2 of FIG. 10.
Figure 12:
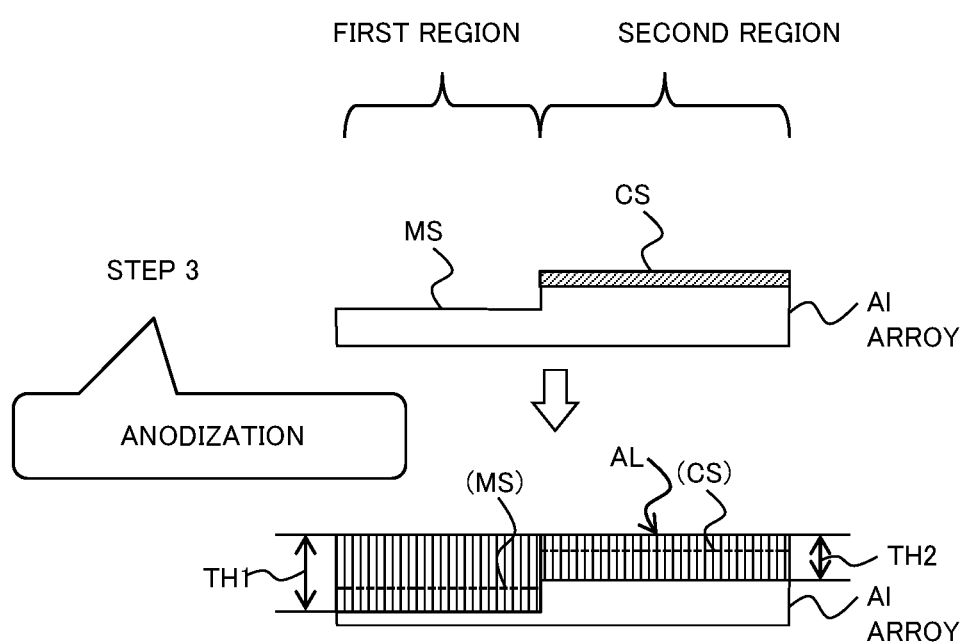
FIG. 12 is a diagram showing an outline of step S3 of FIG. 10.

FIG. 11 is a diagram showing an outline of the step S2. FIG. 11 schematically depicts a partial cross section, including a perimeter of a top surface of the casting piston. As shown in FIG. 11, the top surface of the casting piston is covered with a casting surface CS. In the step S2, the casting surface CS corresponding to the first region is removed by using a grind stone, an end mill, or the like, thereby a material surface MS is exposed. On the other hand, the casting surface CS corresponding to the second region is not removed and remains.

Subsequent to the step S2, anodization of the entire region of the top surface of the casting piston is performed (step S3). The anodization is a process to oxidize a material (i.e., aluminum alloy) constituting a film formation region (i.e., the entire region of the top surface) while supplying electrolyte to the film formation region. FIG. 12 is a diagram showing an outline of the step S3. As shown in FIG. 12, in the step S3, a alumite layer AL is generated in the thickness direction.

In the anodization, a material constituting the film formation region is consumed. However, speed at which the material constituting material surface MS is consumed is higher than that of the material constituting the casting surface CS. That is, the speed at which the alumite layer AL grows in the first region is faster than that in the second region. The reason for this is due to the construction of casting surface CS. Therefore, when the entire region of the top surface is anodized, the alumite layer AL having the layer thickness TH2 thinner than that of the layer thickness TH1 can be obtained.

In the manufacturing method according to the present embodiment, an anodization condition for equalizing a height of the alumite layer AL in the first region and the second region is set in advance. Therefore, by performing the step S3 in accordance with the anodization condition, the top surface having no step at a border between the first region and the second region is formed.

2-2. Effect

According to the manufacturing method described above, only the casting surface CS of the region corresponding to the first region is removed in the step S2. Therefore, it is possible to shorten time required for the machine work of the top surface of the casting piston as compared with a case where the entire region in the top surface of the casting piston is removed. Therefore, it is possible to reduce manufacturing cost of the piston.

Further, according to the manufacturing method described above, the entire region of the top surface containing both material surface MS and casting surface CS is anodized in the step S3. Due to a structure of the alumite layer AL, it is difficult to adjust the layer thickness TH by a cutting work on the top surface. In this regard, in the step S3, the anodization is performed using a difference in reaction speed between the casting surface CS and the material surface MS. Therefore, it is possible to easily obtain the alumite layer AL in which the layer thickness TH2 is thinner than the layer thickness TH1.

What is claimed is:

1. A method for manufacturing a piston of an internal combustion engine including a top surface having a coating composed of porous alumina, wherein the top surface includes:
a first region that includes a part or all of a region connecting to an outer periphery of the top surface; and
a second region that includes a part or all of a region inside the top surface,
wherein the method includes the steps of:
preparing the piston as a casting piston made of aluminum alloy of which the top surface is covered with a casting surface;
removing the casting surface in the first region to expose a material surface of the casting piston, while the casting surface in the second region is not removed; and
forming a porous alumina coating in the first and second regions by anodization of the casting piston including the exposed material surface, wherein an anodization condition for equalizing a height of the porous alumina coating in the first and second regions is predetermined such that the anodization occurs more rapidly in the first region where the casting surface has been removed than in the second region where the casting surface has not been removed and a top surface of the porous alumina coating in the first region after completion of the anodization is even with a top surface of the porous alumina coating in the second region.

2. The method according to claim 1, wherein:
a thickness of the porous alumina coating in the first region after completion of the anodization is greater than a thickness of the porous alumina coating in the second region.

3. The method according to claim 1, wherein:
a valve recess part is formed in the second region of the top surface.

4. The method according to claim 1, wherein:
a valve recess part is formed in the first region of the top surface.

5. The method according to claim 1, wherein:
the first region includes all of the region connecting to the outer periphery of the top surface; and
the second region is located inside the first region.

6. The method according to claim 1, wherein:
the porous alumina coating incudes a plurality of pores extending in a thickness direction of the coating with the pores being open at a top surface of the coating.

* * * * *